(12) United States Patent
Porvaznik et al.

(10) Patent No.: US 7,661,588 B2
(45) Date of Patent: Feb. 16, 2010

(54) STORED-VALUE CARD WITH PEDOMETER AND CLIP

(75) Inventors: Aaron Porvaznik, Minneapolis, MN (US); Timothy P. Clegg, Manhatten Beach, CA (US); Primoz Samardzija, Marina del Ray, CA (US)

(73) Assignee: Target Brands, Inc., Minneapolis, MN (US)

( * ) Notice: Subject to any disclaimer, the term of this patent is extended or adjusted under 35 U.S.C. 154(b) by 127 days.

(21) Appl. No.: 11/687,280

(22) Filed: Mar. 16, 2007

(65) Prior Publication Data

US 2008/0223923 A1 Sep. 18, 2008

(51) Int. Cl.
*G06K 5/00* (2006.01)
*G01C 22/00* (2006.01)

(52) U.S. Cl. .................. 235/380; 235/487; 235/462.01; 235/105

(58) Field of Classification Search ................ 235/105, 235/375, 487, 380; 702/160; 24/578.17, 24/588.12, 700, 685, 686, 688, 697.1; 248/685, 248/445, 447, 688, 231.81; 206/101
See application file for complete search history.

(56) References Cited

U.S. PATENT DOCUMENTS

| | | | |
|---|---|---|---|
| 929,016 A * | 7/1909 | Rensch | .................. 206/449 |
| 3,818,194 A | 6/1974 | Biro | |
| D303,094 S | 8/1989 | Ling | |
| 4,868,376 A | 9/1989 | Lessin et al. | |
| 4,918,631 A | 4/1990 | Hara et al. | |
| D405,441 S | 2/1999 | Saito et al. | |
| 5,931,764 A | 8/1999 | Freeman et al. | |
| 6,188,309 B1 | 2/2001 | Levine | |
| 6,254,001 B1 | 7/2001 | Chan | |
| 6,427,837 B1 * | 8/2002 | Shields | ................... 206/449 |
| 6,431,453 B1 * | 8/2002 | Hill et al. | .................. 235/475 |
| 6,588,658 B1 | 7/2003 | Blank | |

(Continued)

FOREIGN PATENT DOCUMENTS

JP 2003308511 10/2003

OTHER PUBLICATIONS

"Pedometer Card Manufacturer," Global Sources, www.globalsources.com/gsol/l/Pedometer/p/sm/1001658054.htm, printed on Jan. 30, 2007 (2 pages).

(Continued)

*Primary Examiner*—Michael G Lee
*Assistant Examiner*—Keith Goodman, Jr.
(74) *Attorney, Agent, or Firm*—Griffiths & Seaton PLLC

(57) ABSTRACT

A financial transaction card includes an enclosure, a step detector, and a processing device. The enclosure includes an account identifier linked to a financial account or record such that the financial transaction card can be used toward the purchase or use of at least one of goods and services. The step detector is positioned within the enclosure and configured to perceive movement caused each time a person carrying the financial transaction card takes a step. The processing device is positioned within the enclosure and in communication with the step detector, the processing device being configured to identify movement perceived by the step detector and to determine a cumulative number of steps taken by the person while carrying the financial transaction card. Stored-value card assemblies, methods of promoting sales of stored-value cards, methods of using a stored-value card, and other embodiments are also disclosed.

25 Claims, 10 Drawing Sheets

U.S. PATENT DOCUMENTS

| | | |
|---|---|---|
| 6,607,127 B2 | 8/2003 | Wong |
| 6,790,178 B1 * | 9/2004 | Mault et al. .................. 600/300 |
| 6,836,524 B1 * | 12/2004 | Lee ........................... 377/24.2 |
| 7,008,350 B1 | 3/2006 | Yamazaki et al. |
| 7,024,807 B2 | 4/2006 | Street |
| 7,063,255 B2 * | 6/2006 | Algiene ...................... 235/380 |
| D534,913 S | 1/2007 | Wilcox |
| 7,334,616 B2 * | 2/2008 | Kaminski ................... 150/147 |
| 2001/0031031 A1 * | 10/2001 | Ogawa et al. ............... 377/24.2 |
| 2002/0143697 A1 | 10/2002 | Gotfried |
| 2004/0140348 A1 | 7/2004 | Fromm |
| 2006/0055691 A1 | 3/2006 | Bursett |
| 2006/0112754 A1 | 6/2006 | Yamamoto et al. |
| 2006/0217231 A1 * | 9/2006 | Parks et al. ..................... 482/3 |
| 2006/0231109 A1 | 10/2006 | Howell et al. |
| 2006/0242801 A1 * | 11/2006 | Cassaday ..................... 24/67 R |
| 2007/0001087 A1 * | 1/2007 | Shyu et al. ................... 248/688 |
| 2007/0017967 A1 * | 1/2007 | Bhavnani ..................... 235/105 |
| 2009/0124459 A1 * | 5/2009 | Methot .......................... 482/1 |

OTHER PUBLICATIONS

"Credit Card Pedometer M339 Series," Shenzhen Minglifa Opoelectronic Products Co., Ltd., www.minglifa.en.alibaba.com/product/50057064/51362656/Pedometers/Credit_Card_Pedometer_. . . , printed on Jan. 30, 2007 (1 page).

* cited by examiner

STORED-VALUE CARD WITH PEDOMETER AND CLIP

BACKGROUND OF THE INVENTION

Stored-value cards and other financial transactions cards come in many forms. A gift card, for example, is a type of stored-value card that includes pre-loaded or selectively loaded monetary value. In one example, a consumer buys a gift card having a specified value for presentation as a gift to another person. In another example, a consumer is offered a gift card as an incentive to make a purchase. A gift card, like other stored-value cards, can be "recharged" or "reloaded" at the direction of the bearer. The balance associated with the gift card declines as the gift card is used, encouraging repeat visits to the retailer or other provider issuing the gift card. Additionally, the gift card generally remains in the user's purse or wallet, serving as an advertisement or reminder to revisit the associated retailer. Gift cards and other stored-value cards provide a number of advantages to both the consumer and the retailer.

SUMMARY OF THE INVENTION

One aspect of the present invention relates to a financial transaction card including an enclosure, a step detector, and a processing device. The enclosure includes an account identifier linked to a financial account or record such that the financial transaction card can be used toward the purchase or use of at least one of goods and services. The step detector is positioned within the enclosure and configured to perceive movement caused each time a person carrying the financial transaction card takes a step. The processing device is positioned within the enclosure and in communication with the step detector, the processing device being configured to identify movement perceived by the step detector and to determine a cumulative number of steps taken by the person while carrying the financial transaction card. Other related products and methods are also disclosed and provide additional advantages.

BRIEF DESCRIPTION OF THE DRAWINGS

Embodiments of the invention will be described with respect to the figures, in which like reference numerals denote like elements, and in which.

DETAILED DESCRIPTION

Figure 1:
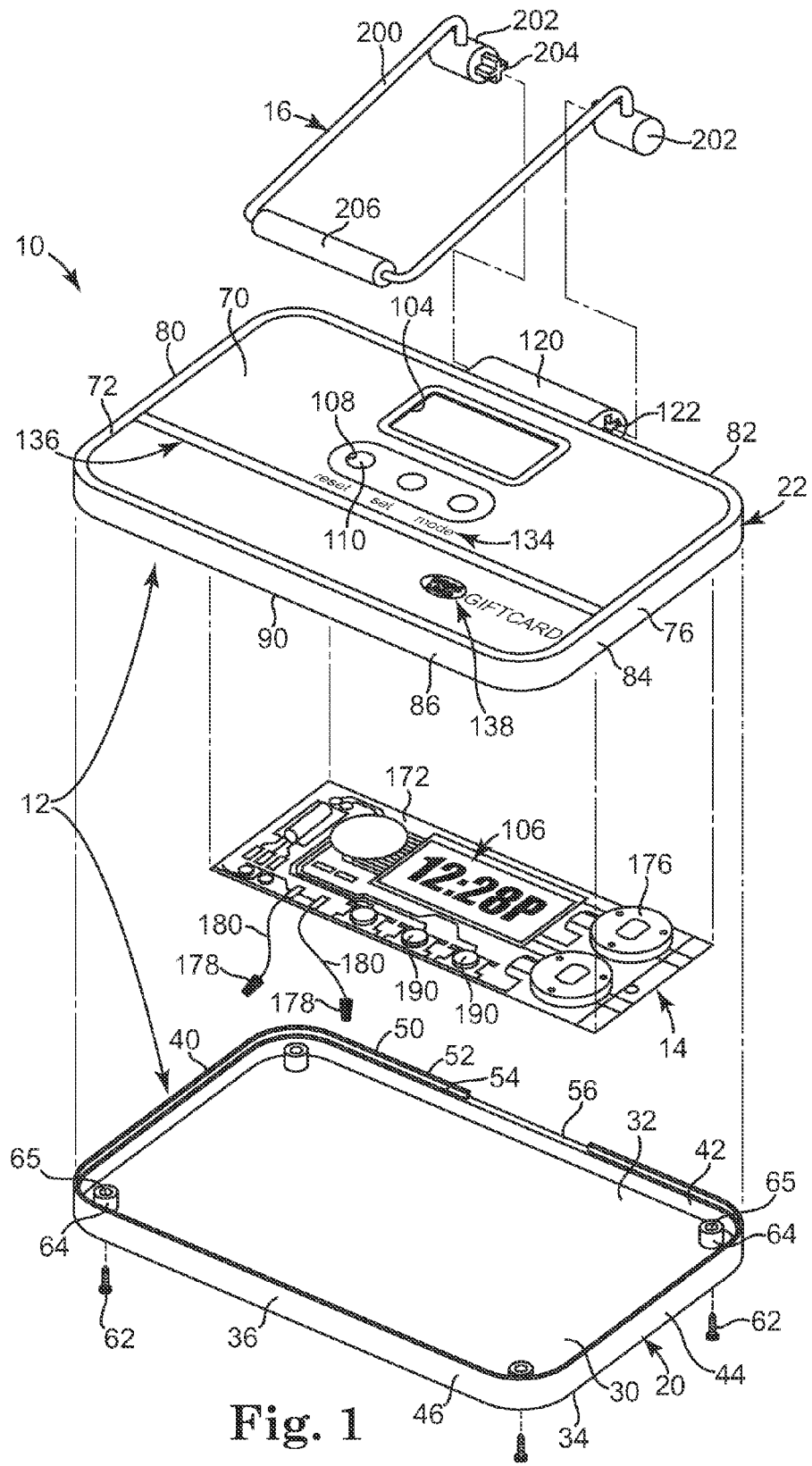
FIG. 1 is an exploded, top perspective view illustration of a stored-value card, according to one embodiment of the present invention.

A stored-value card or financial transaction card is adapted for making purchases of goods and/or services at, for example, a retail store or website. According to one embodiment, an original consumer buys a stored-value card to give a recipient who in turn is able to use the stored-value card at a retail store or setting to pay for goods and/or services. A stored-value card, according to embodiments of the present invention, provides the consumer and recipient with functionality in addition to the ability to pay for goods and/or services with the stored-value card.

In particular, in one embodiment, the stored-value card also includes one or more of a clip and a pedometer. The clip facilitates selective coupling of the stored-value card to a bearer of the stored-value card (e.g., to a belt of the card bearer, a pant waistline of the card bearer, a pocket of clothing worn by the card bearer, etc.). The pedometer is configured to track and display to the card bearer the number of steps taken, miles traveled, calories burned, etc. while the stored-value card is worn or otherwise carried by the card bearer. As such, in addition to providing tender for purchases, the stored-value card is also useful to determine the amount of activity performed by the card bearer during a given time period (e.g., the time period in which the card bearer wears or otherwise carries the stored-value card). In one embodiment, the clip and/or additional pedometer functionality of the stored-value card promotes the sale, use, and/or loading of the stored-value card by potential consumers and/or bearers of the stored-value card.

Turning to the figures, FIGS. 1-6 illustrate one embodiment of a stored-value card according to the present invention generally at 10. In particular, referring to the exploded perspective view of FIG. 1, in one embodiment, stored-value card 10 includes a housing 12, a processing device such as an electrical assembly 14, and a clip 16. The clip 16 facilities coupling stored-value card 10 to a card bearer, and electrical assembly 14 communicates with a step detector or movement sensing mechanism 18 (only illustrated coupled to cover 22 in FIGS. 7 and 8) included within the housing 12 to track the activity or movement of the card bearer while the stored-value card 10 is clipped to or otherwise carried by the card bearer.

Housing 12 includes a first housing member or base 20 and a second housing member or cover 22. One embodiment of base 20 is illustrated, for example, in FIGS. 1 and 3. Base 20 generally includes a primary panel 30, which, in one embodiment, is substantially planar and defines an inside surface 32 and an outside surface 34 (FIG. 3) opposite inside surface 32. In one embodiment, primary panel 30 is generally rectangular and sized similarly to an identification card, a credit card, or other card sized to fit in a wallet of a user. In other embodiments, primary panel 30 is otherwise shaped as a square, circle, oval, star, or any other suitable shape.

In one example, base 20 additionally includes a side wall 36 extending from inside surface 32 away from outside surface 34 and extending substantially about the entire perimeter of primary panel 30. In one embodiment, side wall 36 extends away from inside surface 32 with a substantially perpendicular orientation relative to primary panel 30. In one example, side wall 36 generally defines four substantially linear side wall segments 40, 42, 44, and 46. In particular, first side wall segment 40 extends substantially parallel to and is positioned opposite third side wall segment 44. Second side wall segment 42 and fourth side wall segment 46 each extend between first side wall segment 40 and third side wall segment 44 opposite and substantially parallel to one another.

Side wall 36 extends from primary panel 30 to define an inside edge 50 opposite primary panel 30. In one example, inside edge 50 is formed as a stepped edge including a first portion 52 and a second portion 54. First portion 52 extends from primary panel 30 a further distance than second portion 54 extends from primary panel 30, as illustrated in FIG. 1. In one example, first portion 52 extends generally about the perimeter of second portion 54. In this respect, inside edge 50 is formed as a stepped edge with the lower, second portion 54 being positioned just inside higher, first portion 52. In one embodiment, at least first portion 52 forms curved or chamfered corners at the intersection of each side wall segments 40, 42, 44, and 46 with another one of side wall segments 40, 42, 44, and 46. In one example, side wall 36 includes a cutout 56, which, for example, may be centered on second side wall segment 42 from inside edge 50 toward primary panel 30, as will be further described below.

A plurality of apertures 60 (generally indicated in FIG. 3) extend through primary panel 30. More particularly, each aperture 60 extends from outside surface 34 through inside surface 32. In one embodiment, one aperture 60 is positioned near the intersection of each side wall segment 40, 42, 44, and 46 with another one of side wall segments 40, 42, 44, and 46. In one embodiment, apertures 60 are sized to at least partially receive a connection device 62 such as a screw, etc. formed separately from base 20 and cover 22 for coupling base 20 with cover 22. In one example, each aperture 60 allows the head of the screw or other attachment device 62 to be recessed and, accordingly, includes a slightly larger section nearer outside surface 34 than near inside surface 32.

In one embodiment, a cylindrical protrusion 64 extends from inside surface 32 parallel to side wall 36 around each aperture 60 and acts as a spacer between base 20 and cover 22 and/or is threaded to further support the screw or other device 62 extending therethrough In one embodiment, each protrusion 64 defines a threaded cavity 65 therein configured to receive a screw or other connection device 62 for coupling base 20 with cover 22, as will be further described below.

One embodiment of cover 22 is illustrated with reference to FIGS. 1, 2, and 7. Cover 22 generally includes a primary panel 70, which, in one embodiment, is substantially planar and defines an outside surface 72 and an inside surface 74 (e.g., FIG. 7) opposite outside surface 72. In one embodiment, primary panel 70 is generally sized similarly to primary panel 30 of base 20.

Cover 22 additionally includes a side wall 76 extending from inside surface 74 away from outside surface 72 and extending substantially about the entire perimeter of primary panel 70. In one embodiment, side wall 76 extends away from inside surface 74 with a generally perpendicular orientation relative to primary panel 70. In one example, side wall 76 generally defines four substantially linear side wall segments 80, 82, 84, and 86. In particular, first side wall segment 80 extends substantially parallel to and is positioned opposite third side wall segment 84. Second side wall segment 82 and fourth side wall segment 86 each extend between first side wall segment 80 and third side wall segment 84 opposite and substantially parallel to one another.

Figure 7:
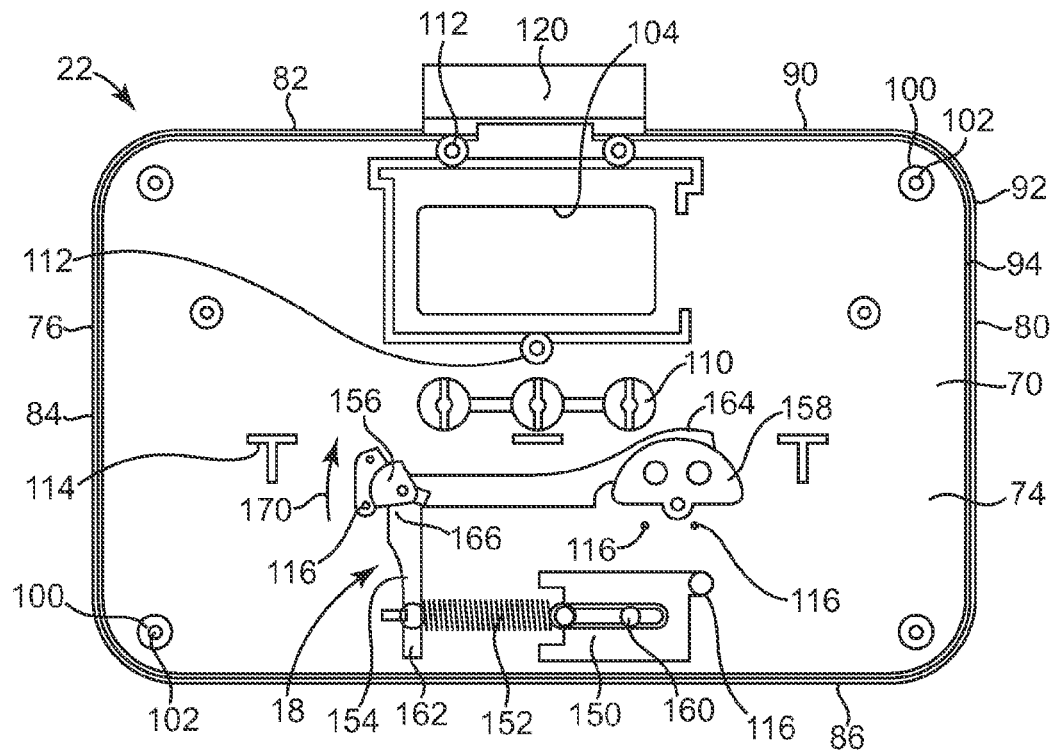
FIG. 7 is a bottom view illustration of a cover of the stored-value card of FIG. 1 with buttons and a motion detecting mechanism, according to one embodiment of the present invention.
Figure 8:
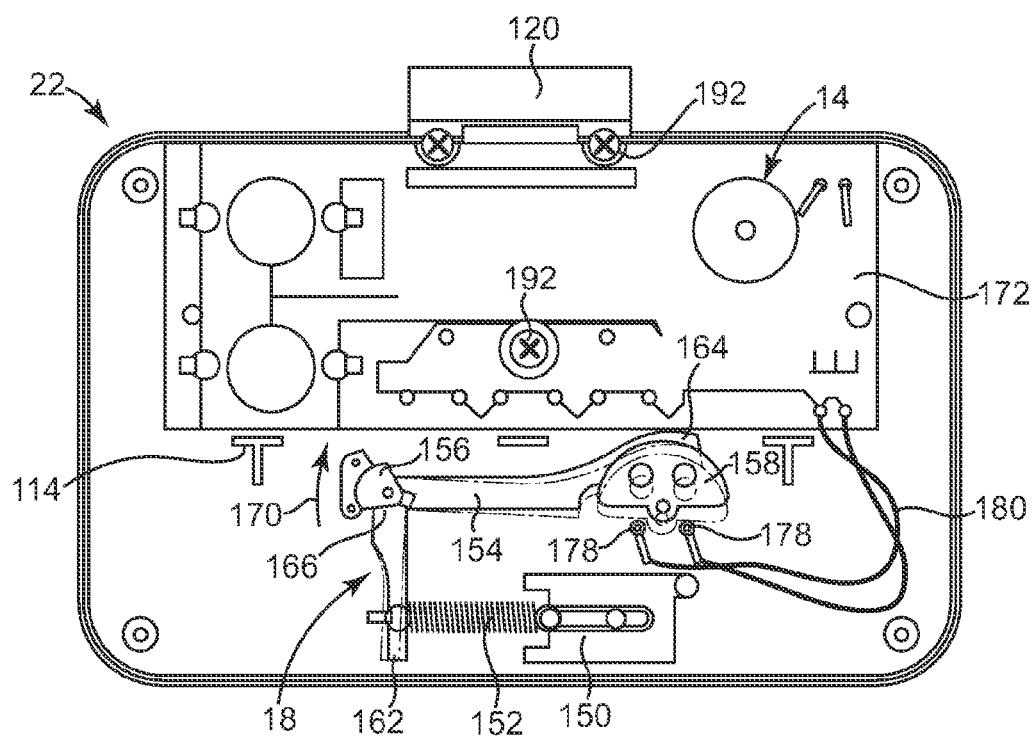
FIG. 8 is a bottom view illustration of the cover of the stored-value card with the buttons and the motion detecting mechanism of FIG. 7 with circuitry of FIG. 1, according to one embodiment of the present invention.

As illustrated with respect to FIG. 1 in view of FIGS. 7 and 8, side wall 76 extends from primary panel 70 to define an inside edge 90 opposite primary panel 70. In one example, inside edge 90 is formed as a stepped edge including a first portion 92 and a second portion 94. Second portion 94 extends from primary panel 70 a further distance than first portion 92 extends from primary panel 70. In one example, first portion 92 extends substantially about the outer perimeter of second portion 94. In this respect, inside edge 90 is formed as a stepped edge with the higher, second portion 94 being positioned just inside lower, first portion 92. In one embodiment, at least first portion 92 forms curved or chamfered corners at the intersection of each side wall segments 80, 82, 84, and 86 with another one of side wall segments 80, 82, 84, and 86. In one embodiment, stepped inside edge 90 of cover 22 cooperatively mates with stepped inside edge 50 of base 20.

Cover 22 includes a plurality of protrusions 100 extending from inside surface 74 parallel to side wall 76. In one embodiment one protrusion 100 is positioned near each of the corners of edge 90 (i.e. near the intersections of side wall segments 80, 82, 84, and 86 with another side wall segment 80, 82, 84, and 86). Each protrusion 100 is positioned on cover 22 to generally align with one of apertures 60 and one of protrusions 64 of base 20 upon assembly. A threaded cavity 102 is formed within each protrusion 100. In one embodiment, each threaded cavity 102 is configured to receive a screw or other connection device 62 for coupling base 20 with cover 22.

In one example, a display aperture 104 is defined through primary panel 70. The display aperture 104 is sized and shaped to accommodate viewing of a display screen 106 of electrical assembly 14, as will be further described below. In one embodiment, display aperture 104 is substantially rectangular, is centered between first side wall segment 80 and third side wall segment 84, and/or is positioned relatively nearer second side wall segment 82 as compared to fourth side wall segment 86. A plurality of other apertures, such as button apertures 108 may also be formed through primary panel 70. In one embodiment, three button apertures 108 are defined through primary panel 70, and each button aperture 108 is sized and shaped to receive a polymeric, rubberized, or other suitable button 110 aligned with the corresponding portion of electrical assembly 14, as will be further described below.

Referring to FIG. 7, in one example, cover 22 includes one or more threaded protrusions 112 extending from the inside surface 74 of cover 22 substantially parallel to side wall 76. Each threaded protrusion 112 is sized and positioned to facilitate attachment of the electrical assembly 14, as will be further described below. Cover 22 additionally includes one or more alignment features 114 and one or more posts or coupling members 116 each extending from inside surface 74 of primary panel 70 in a direction substantially parallel to side wall 76. Each alignment feature 114 is configured to interact with the electrical assembly 14 or other member(s) or assembly(ies) within housing 12 to align electrical assembly 14 or other member(s) with housing 12. Each coupling member 116 is configured to facilitate coupling of various members and/or assemblies with the movement sensing mechanism 18, which will be described in additional detail below.

Figure 9:
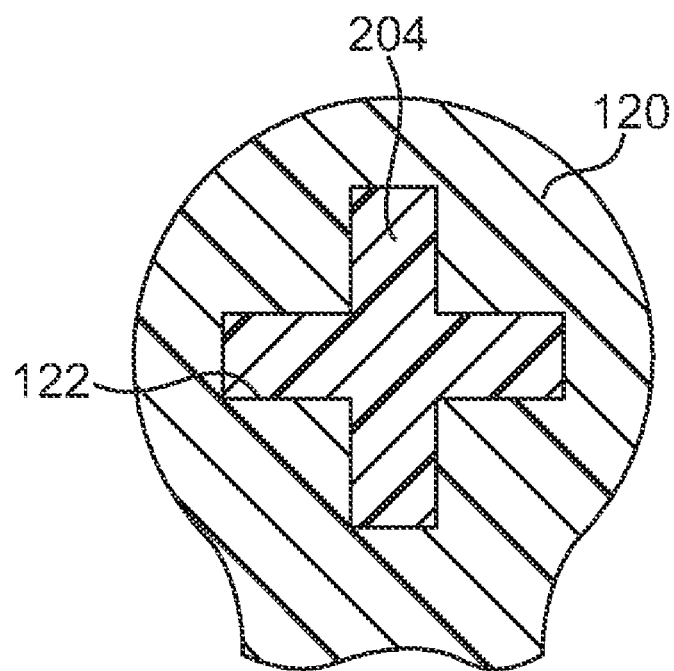
FIG. 9 is a cross-sectional view illustration of a portion of the stored-value card of FIG. 2 taken along the line 9-9.

In one embodiment, housing 12 includes a clip reception portion 120 such as a tubular extension from the perimeter of base 20 and/or cover 22. In one example, clip reception portion 120 extends from second side wall segment 82 of cover 22 and defines an internal cavity 122 (FIGS. 1 and 9) at each end of clip reception portion 120 configured to receive a portion of clip 16 on each end thereof. As such, where housing 12 is otherwise substantially rectangular in card shape or form factor, clip reception portion 120 extends outwardly from the otherwise rectangular card form factor. In one example, each internal cavity 122 has a substantially X-shaped cross-section as illustrated in FIG. 9. In one embodiment, clip reception portion 120 is centered along second side wall segment 82 between first side wall segment 80 and third side wall segment 84.

Base 20 and cover 22 are coupled together in any suitable manner. In one embodiment, stepped interface edge 50 of base 20 is positioned to abut with stepped interface edge 90 of cover 22. As such, side wall 36 of base 20 and side wall 76 of cover 22 collectively define a housing side wall extending between base primary panel 30 and cover primary panel 70. In one embodiment, base 20 and cover 22 are secured to one another with connection devices 62 thread through aperture 60, threaded cavity 65, and threaded cavity 102. Other agents for coupling base 20 and cover 22 are also contemplated.

In one embodiment, each of base 20 and cover 22 is formed by injection molding of a plastic such as PVC or any other suitable material to define the various attributes of base 20 and cover 22. Other methods of forming base 20 and cover 22 are also contemplated. In one example, base 20 and cover 22 are each formed of materials having a similar or identical color. In other examples, base 20 and cover 22 may be formed of materials having different coloring.

Housing 12 includes an account identifier 130 such as a barcode, magnetic strip, a smart chip or other electronic device, a radio frequency identification device, or other suitable identifier readily and machine readable by a point-of-sale terminal or other account access station or kiosk. In one embodiment, account identifier 130 is printed on outside surface 34 of base 20. Account identifier 130 indicates a stored-value account or record to which stored-value card 10 is linked. The account or record of the monetary or other value balance on stored-value card 10 optionally is maintained on a database, other electronic or manual record-keeping system, or, in the case of "smart" cards for example, on a chip or other electronics or devices on stored-value card 10 itself. Accordingly, by scanning account identifier 130, a financial account or record linked to stored-value card 10 is identified and can subsequently be activated, have amounts debited therefrom, and/or have amounts added thereto. With the above in mind, account identifier 130 is one example of means for linking stored-value card 10 with a financial account or record.

In one embodiment, housing 12 additionally includes redemption indicia 132, which, in one example, are included on outside surface 34 of base 20. Redemption indicia 132 indicate that stored-value card 10 is redeemable for the purchase of goods and/or services and that, upon use, a value of the purchased goods and/or services will be deducted from the financial account or record linked to stored-value card 10. In one embodiment, redemption indicia 132 include phrases such as "<NAME OF STORE> GiftCard" and "This GiftCard is redeemable for merchandise or services at any of our stores or at our web site," and/or provides help or phone line information in case of a lost, stolen, or damaged stored-value card, etc.

In one embodiment, other indicia may also be included on outside surface 72 of cover 22, such as button identification indicia 134, which are positioned near and identifies the function of each button 110, decorative indicia 136, brand indicia 138, which identify a brand associated with stored-value card 10 such as identifying a product brand, a store brand, other indicia readily associated with a product or store, etc. Any of account identifier 30 and indicia 132, 134, 136, and 138 may be printed directly on, printed on a label applied to, or otherwise included on housing 12.

Electrical assembly 14 and movement sensing mechanism 18 are each substantially enclosed within housing 12. Movement sensing mechanism 18 is configured to detect movement of stored-value card 10 and, hence, of the bearer of stored-value card 10 while stored-value card 10 is clipped to or otherwise carried by the bearer. Movement sensing mechanism 18 is coupled with electrical assembly 14, and electrical assembly 14 is configured to process the movement data from movement sensing mechanism 18 into a format that can be communicated to the bearer with in a useable format. As such, movement sensing mechanism 18 in combination with electrical assembly 14 function as a pedometer.

Referring to FIGS. 7 and 8, in one embodiment, movement sensing mechanism 18 includes an anchor plate 150, a coil spring 152, an arm 154, a pivot member 156, and a conductive member or foot 158. Movement sensing mechanism 18 may be positioned relative to and coupled with housing 12 in any suitable manner, for example, within cover 22. For example, anchor plate 150 is securely coupled with inside surface 74 of cover primary panel 70 with a small screw 160, adhesive, and/or in any other suitable manner. Pivot member 156 is also securely coupled with primary panel 70 such as at least partially via interaction with coupling members 116 of cover 22. Arm 154 is coupled with pivot member 156 such that arm is configured to rotate about its connection with pivot member 156.

In one embodiment, arm 154 is substantially L-shaped and defines a first end 162, a second end 164, and a corner or vertex 166 therebetween. In one example, arm 154 is coupled with pivot member 156 near vertex 166 of arm 154 such that arm 154 is able to rotate about pivot member 156 at least between a first position as illustrated in FIGS. 7 and 8 and a second position as illustrated in dashed lines in FIG. 8. More particularly, first end 162 of arm 154 is coupled with anchor plate 150 via coil spring 152 or other biasing member. As such, coil spring 152 biases arm 154 in the first position. Foot 158 of pedometer mechanism 18 is conductive and is coupled with arm 154 near second end 164. In one embodiment, while foot 158 is conductive, one or more of anchor plate 150, arm 154, and pivot member 156 are formed of a non-conductive material, such as a polymeric or other suitable material.

Foot 158 is formed of a material with sufficient weight or is otherwise weighted such that movement, impact, or vibration of stored-value card 10 (such as movement or vibration caused by the card bearer impacting their foot on a hard floor, ground, etc. while walking or running) generally causes foot 158 of pedometer mechanism 18 to move downwardly as indicated in dashed lines in FIG. 8, which thereby rotates arm 154 as generally indicated by arrow 170 in FIGS. 7 and 8. In one example, foot 158 of pedometer mechanism 18 moves downwardly toward two coupling members 116 of cover 22 that extend generally perpendicularly from the inside surface 74 thereof. As such, two coupling members 116 are positioned just below foot 158 and collectively act as a stop limiting rotation of arm 154 and, therefore, movement of foot 158.

Following movement of arm 154 into the second position, the bias provided by spring 152 pulls first end 162 of arm 154, and therefore, rotates all of arm 154, back to the first position of FIGS. 7 and 8. Notably, in the first position, foot 158 moves away from the two coupling/stop members 116 referenced above. In this manner, as a bearer of stored-value card 10 walks, foot 158 moves up and down (based on the impact of stepping and the bias of coil spring 152) and, therefore, arm 154 rotates between first and second positions with each step made by the card bearer.

In one embodiment, electrical assembly 14 includes a printed circuit board 172, which supports various components including a display screen 106, a power source 176, and other circuitry, and two conductive members 178 electrically coupled with the components disposed on printed circuit board 172, for example, with coupling wire 180. The two conductive members 178 are any suitable conductors such as two conductive coil springs, tubular members, clips, etc. Each conductive member 178 is coupled to cover 22, for example, to coupling members 116 positioned near to, but spaced from one another and near to foot 158 of pedometer mechanism 18 (e.g., the stop-like coupling members 116 for foot 158). For example, where two conductive members 178 are springs, each conductive member 178 is coaxially positioned around one of coupling members 116.

Electrical assembly 14 is configured such that at least one circuit is left open due to the spacing of conductive members 178 relative to each other and the lack of a conductor extending therebetween. In this manner, as foot 158 moves between the first and second positions as described above, foot 158 in the second position is configured to contact and extend between the two conductive members 178. Since, as described above, foot 158 is conductive, foot 158 thereby completes the open circuit of electrical assembly 14 when in the second position. The completion of the open circuit triggers electrical assembly to record and count the circuit closure as a step made by the card bearer wearing or otherwise carrying stored-value card 10. As such, electrical assembly 14 is configured to count each time the conductive circuit is closed as a step made by the card bearer. When in the proper mode, electrical assembly 14, more particularly, display screen 106, is configured to display content including one or more of a number of steps counted in this manner, a number of calories burned, and a distance walked based on this step information via display screen 106.

In one example, electrical assembly 14 includes one or more switches 190 configured to trigger changes in the data shown on display screen 106, to permit data entry to electrical assembly 14, or to otherwise permit a card bearer to interact with electrical assembly 14. In one embodiment, the one or more switches 190 includes a first switch configured to at least reset settings of electrical assembly 14, which may have been previously selected by the card bearer, a second switch configured to permit a function, mode, time, etc. of electrical assembly 14 to be set by the card bearer, and a third switch configured for use in selecting which mode of electrical assembly 14 is shown on display screen 106. In one embodiment, the one or more switches 190 are each any suitable switch such as a snap button, depression switch, lever, pressure sensitive switch, etc. coupled with printed circuit board 172 of electrical assembly 14.

Display screen 106 is any suitable screen configure to visibly display output information to the card bearer regarding their activity level (e.g., including one or more of cumulative number of steps taken, cumulative number of calories burned, cumulative distance walked, etc.) while carrying stored-value card 10 and/or to assist the card bearer in adjusting the settings or entering information to electrical assembly 14 via buttons 110. For example, to flash portions of a time display when a clock of the electrical assembly is being set, to display a weight or a stride length when the card bearer is adjusting or otherwise entering his/her weight or his/her stride length to the electrical assembly, etc.

In one embodiment, power source 176 of electrical assembly 14, is an internal battery, etc. configured to power display screen 106 and the workings of electrical assembly 14, as will be apparent to those of skill in the art upon reading this application. Other components of electrical assembly 14 configured to perform the functionality of the stored-value card will also be apparent to those of skill in the art upon reading the present application.

Clip 16 is any clip suitable for facilitating a card bearer in carrying or wearing stored-value card 10. One example, clip 16 as illustrated in FIG. 1, includes a clip body 200, coupling members 202, and/or a pad, roller, or other impact member 206. In one embodiment, clip body 200 is substantially U-shaped and is coupled with coupling members 202 at either end thereof. In one embodiment, clip body 200 is formed of a metal and/or is configured to flex under force, but is biased to return to its original shape when the force is removed. In one example, while clip body 200 is formed of metal, coupling members 202 and/or impact member 206 are formed of an alternative material such as plastic, acrylic, polymeric, or other suitable materials.

Each coupling member 202 includes a protrusion 204 extending toward the other coupling member 202. In one example, each protrusion 204 has a substantially X-shaped cross-section as illustrated in FIG. 1 and the cross-sectional view of FIG. 9. Coupling members 202 are positioned to each be received within an opposing cavity 122 of clip reception portion 120 of housing 12. Coupling members 202 may be biased toward one another due to the properties of clip body 200 to facilitate coupling with clip reception portion 120.

In one embodiment, impact member 206 extends along a portion of clip body 200 opposite coupling members 202 and is configured to facilitate interaction with a card bearer and/or the clothing of the card bearer, etc. More specifically, in one example, impact member 206 extends around a longitudinal segment of the clip body opposite coupling members 202. Other coupling members 202 are also contemplated for use in coupling clip 16 to housing 12 of stored-value card 10. Coupling clip 16 is also contemplated for use with other stored-value cards that may or may not include movement sensing mechanism 18.

Figure 10:
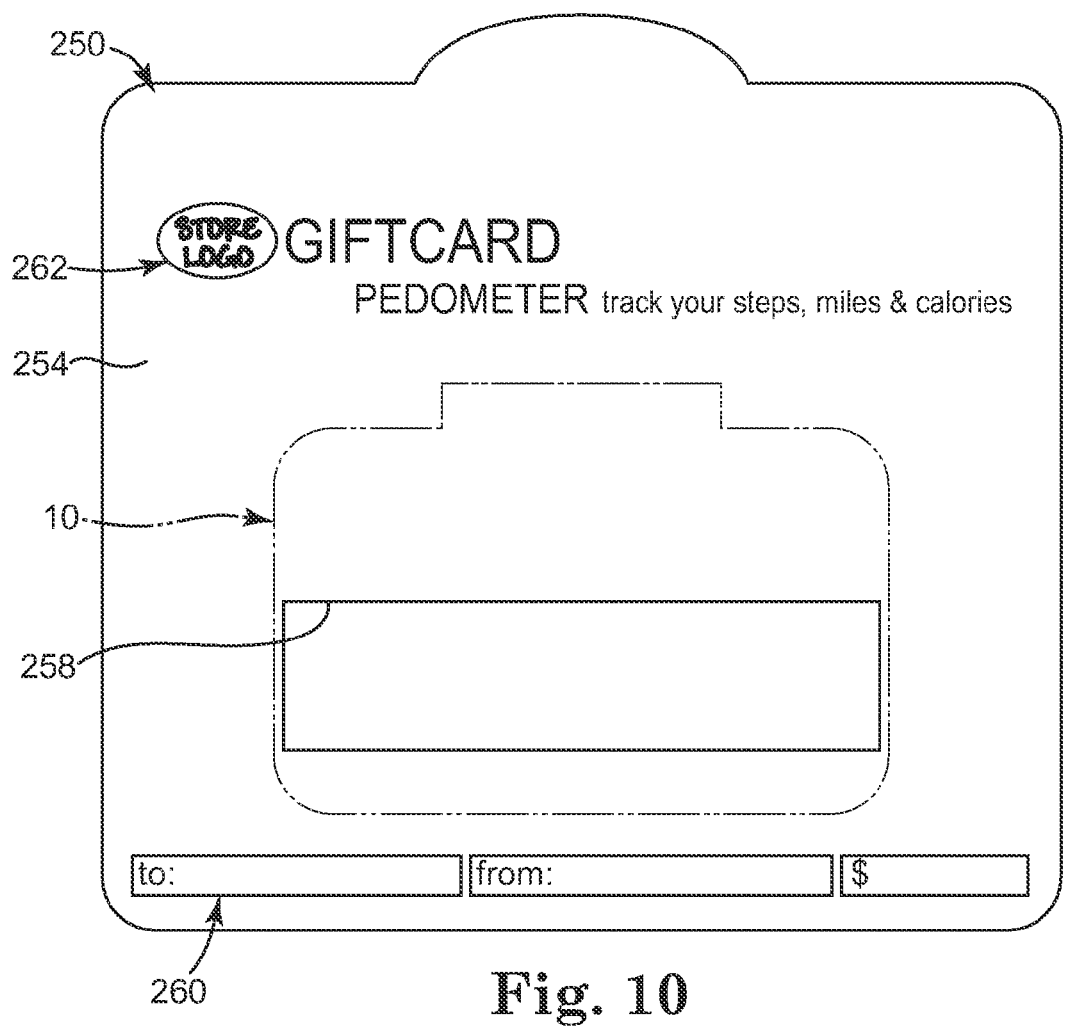
FIG. 10 is a front view illustration of one embodiment of a carrier for a stored-value card, according to one embodiment of the present invention.
Figure 11:
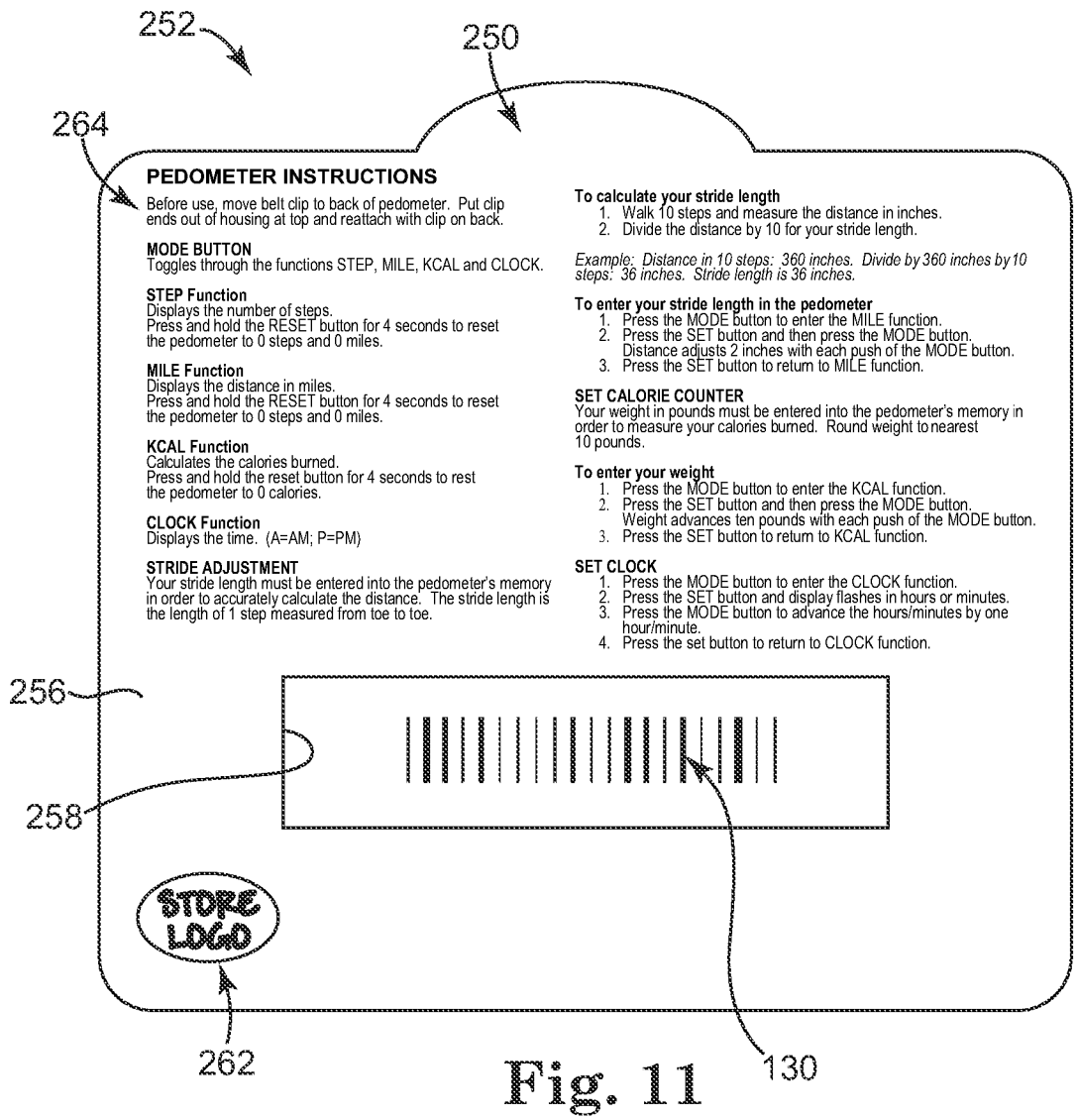
FIG. 11 is a back view illustration of the carrier of FIG. 10 with a stored-value card, according to one embodiment of the present invention.

FIGS. 10 and 11 illustrate a carrier or backer 250 for supporting stored-value card 10. In one embodiment, backer 250 comprises a single layer or multiple layers of paper or plastic material, for example, generally in the form of a relatively stiff card. As such, backer 250 defines a front surface 254 and a rear surface 256 opposite front surface 254. Stored-value card 10, which is represented in phantom lines on front surface 254 in FIG. 10 for illustrative purposes so as to not obstruct backer 250, is readily releasably attached to backer 250, for example by a removable adhesive, skinning, or the like. Backer 250 and stored-value card 10 collectively define a stored-value card assembly 252 (FIG. 11).

Backer 250 includes an opening or window 258 for displaying account identifier 130 of stored-value card 10 therethrough as illustrated in FIG. 11. As previously described, account identifier 130 is adapted for accessing a stored-value account or a stored-value record associated with stored-value card 10 for activating, loading, or debiting values (e.g., monetary points, calling minutes, or other values) from the account or record. Accordingly, window 258 allows viewing or other access to account identifier 130 to activate and/or load stored-value card 10 without removing stored-value card 10 from backer 250. In one embodiment, where no window 258 is defined by backer 250, a portion of backer 250 is configured to be folded away from the remainder of backer 250 to access account identifier 130 without removing stored-value card 10 from backer 250.

Backer 250 displays indicia, graphics or text information including store logo(s), store name(s), slogans, advertising, instructions, directions, brand indicia, promotional information, holiday indicia, seasonal indicia, media format identifiers, characters, and/or other information. For example, indicia 260 include to, from, amount, and/or message fields. The fields of indicia 260 provide areas of backer 250 configured to be written upon by a consumer to personalize backer 250 for presentation as a gift to a particular recipient, for a particular purpose, and/or to indicate a value of stored-value card 10.

Brand indicia 262 may also or alternatively be included to identify a store, brand, department, etc. and/or services associated with stored-value card 10. Instructional indicia 264 includes detailed information regarding use of stored-value card 10 including the pedometer functionality thereof. In particular, instructional indicia 264 may include information relating to available modes of stored-value card 10, the various functions of stored-value card 10 (e.g., a step function, mile function, calorie function, clock function, stride adjustment, settings, etc.) Any of indicia 132 (e.g., FIG. 3), 134, 138 (e.g., FIGS. 1 and 2), 260, 262, 264 or other indicia optionally may appear anywhere on backer 250 or stored-value card 10. Additional information besides that specifically described and illustrated herein may also be included and/or one or more of indicia 132, 134, 138, 260, 262, and 264 may be eliminated. Other backers similar to or different than backer 250 can be used having various sizes and shapes for supporting stored-value card 10.

Figure 12:
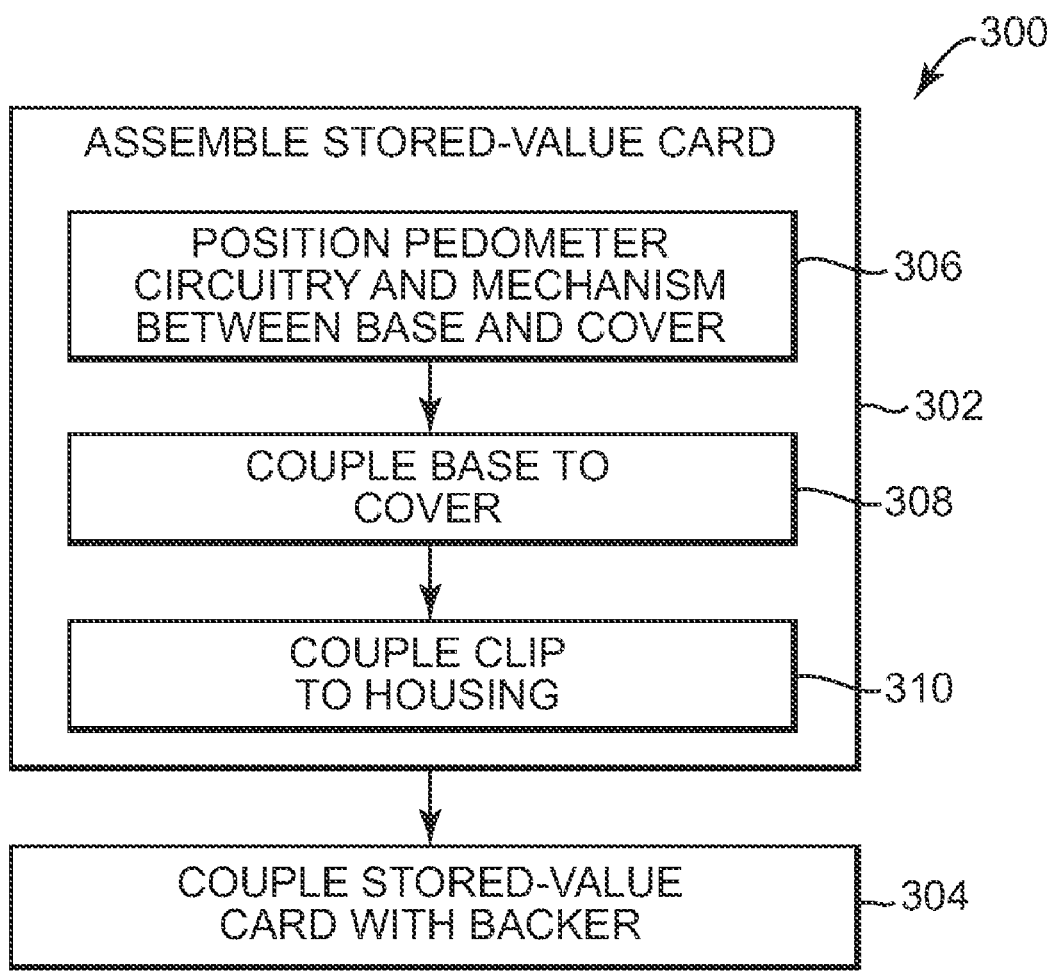
FIG. 12 is a flow chart illustrating a method of assembling a stored-value card, according to one embodiment of the present invention.

FIG. 12 is a flow chart illustrating one embodiment of a method 300 of assembling stored-value card assembly 252 (FIG. 11) and is described with particular reference to stored-value card 10 of FIG. 1 and backer 250 of FIGS. 10 and 11. At 302, stored-value card 10 is assembled and, at 304, stored-value card 10 is coupled with backer 250 to form stored-value card assembly 252. In one embodiment, assembly at 302 includes positioning electrical assembly 14 and movement sensing mechanism 18 within housing 12 at 306. More specifically, with reference to FIGS. 7 and 8, movement sensing mechanism 18 is mounted within cover 22 via coupling members 116 which extending from inside surface 74 of cover 22, screw 160, and/or in any other suitable manner.

Figure 2:
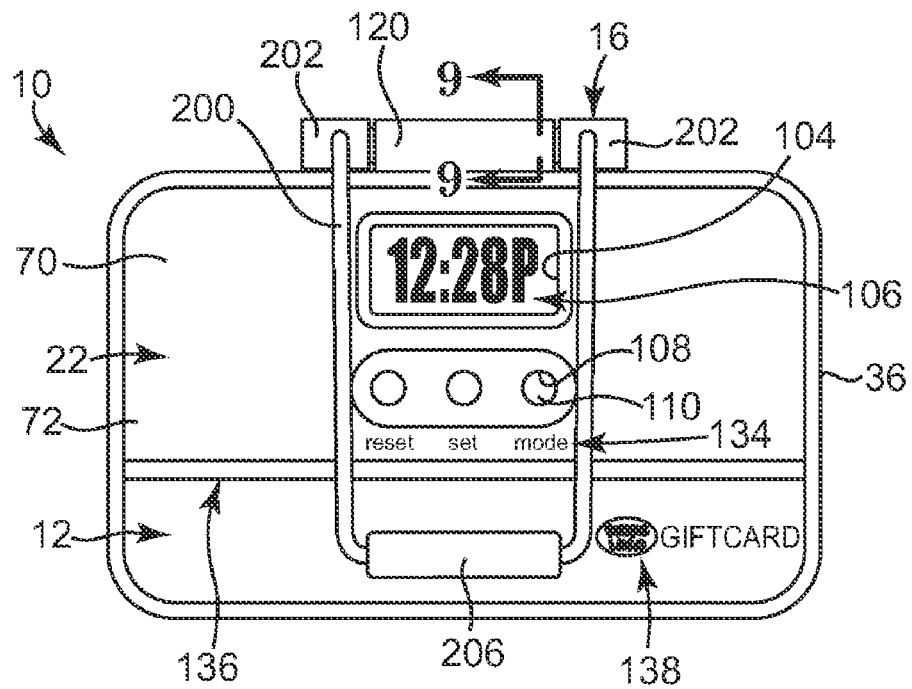
FIG. 2 is a top view illustration of the stored-value card of FIG. 1, according to one embodiment of the present invention.
Figure 3:
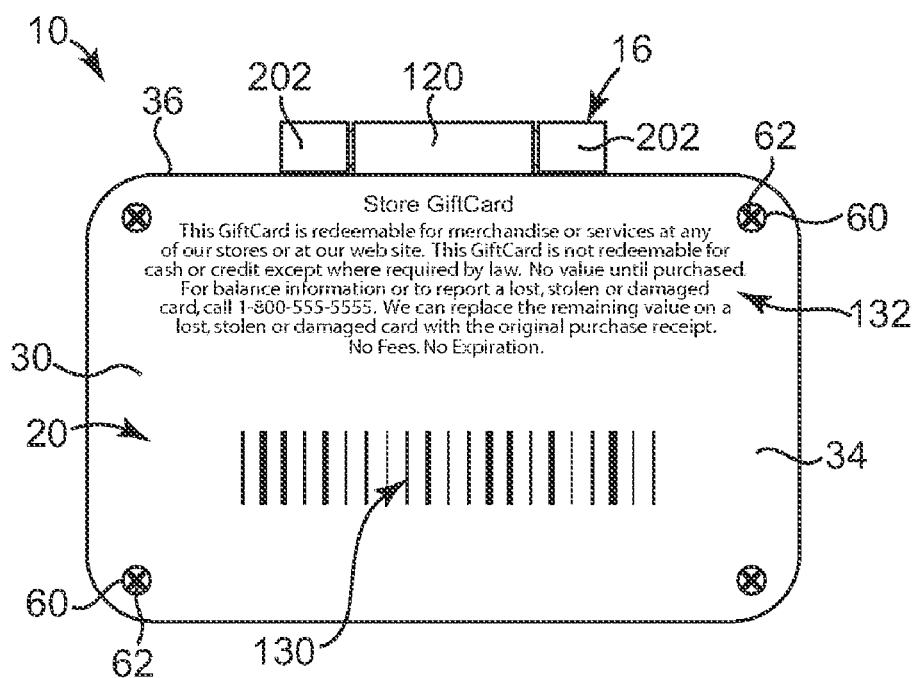
FIG. 3 is a rear view illustration of the stored-value card of FIG. 1, according to one embodiment of the present invention.
Figure 4:
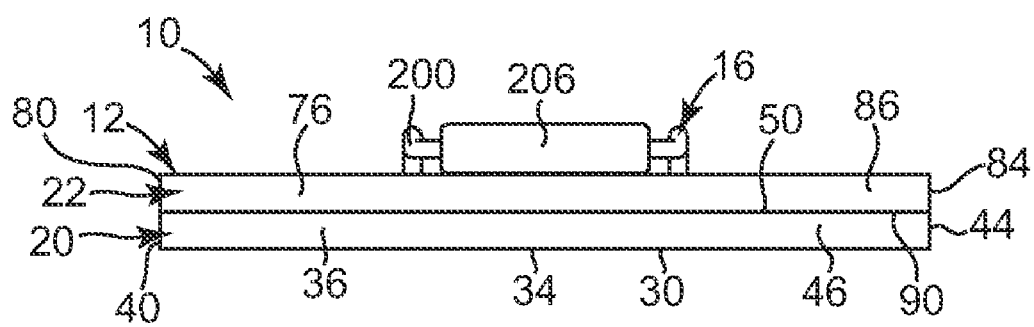
FIG. 4 is a bottom view illustration of the stored-value card of FIG. 1, according to one embodiment of the present invention.
Figure 5:
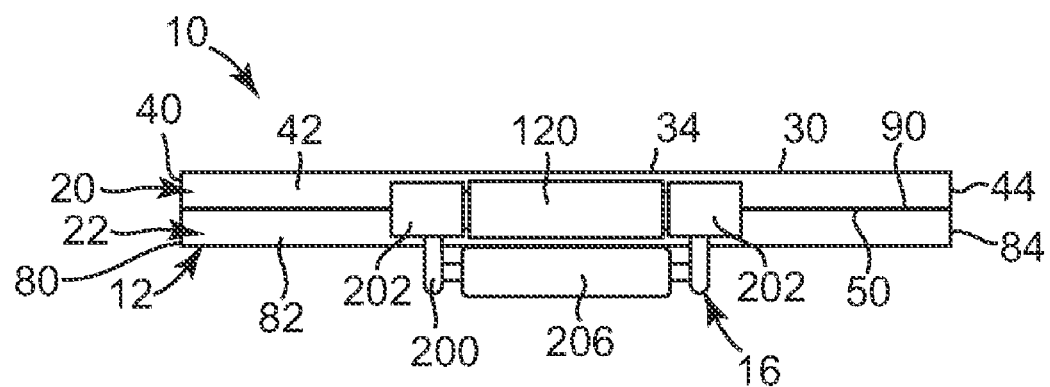
FIG. 5 is a top view illustration of the stored-value card of FIG. 1, according to one embodiment of the present invention.
Figure 6:
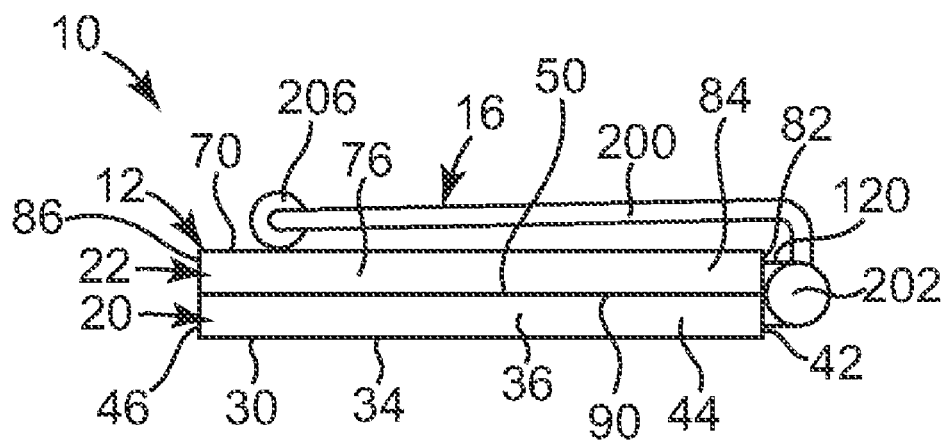
FIG. 6 is a right side view illustration of the stored-value card of FIG. 1, according to one embodiment of the present invention, where the left side view is a mirror image thereof.

Electrical assembly 14 is positioned in cover 22 to align display screen 106 with aperture 104 in cover 22, and to align switches 190 of electrical assembly 14 with apertures 108 of cover 22 and buttons 110 positioned therein (FIGS. 1 and 2). In one embodiment, the one or more alignment features 114 are positioned to facilitate positioning and alignment of electrical assembly 14 within housing 12. In one example one or more alignment feature 114 interacts with an edge of printed circuit board 172 to provide rough alignment of electrical assembly 14 relative to cover 22. Electrical assembly is coupled with cover 22 in any suitable manner, such as with connection devices 192 (e.g., screws, rivets, adhesive, etc.) screwed through printed circuit board 172 and into one of threaded protrusions 112.

Once coupled to cover 22, electrical assembly 14 is positioned such that display screen 106 is visible through aperture 104 and such that depression of buttons 110 causes depression of switches 190. In addition, conductive members 178 are coupled to housing 12, such as by coupling members 116 of cover 22 near foot 158 of movement sensing mechanism 18, in a position permitting simultaneous contact with foot 158 when foot 158 is moved to a second position as described above.

Subsequently, at 308, housing 12 is assembled by coupling base 20 with cover 22. More specifically, cover 22 is placed upon base 20, or vice versa. Accordingly, base 20 is placed on cover 22 such that inside edge 50 of base 20 interfaces with inside edge 90 of cover 22. More specifically, first portion 52 and second portion 54 of inside edge 50 interface with first portion 92 and second portion 94 of inside edge 90, respectively. The stepped interface provides for a stable and generally neat coupling of base 20 and cover 22.

Once base 20 and cover 22 are mated, each aperture 60 (FIG. 3) is aligned with one protrusion 64 (FIG. 1) and one protrusion 100 (FIGS. 7 and 8). In one embodiment, mating base 20 and cover 22 also positions clip reception portion 120 to be at least partially positioned within side wall cutout 56 of base 20. Once base 20 and cover 22 are mated, attachment mechanisms, such as connection device 62 (e.g., screws, rivets, etc.) are threaded through apertures 60 and into threaded cavities 65 and 102 to secure base 20 to cover 22. Other methods of securing base 20 to cover 22, for example, via friction fit, adhesive, etc., are also contemplated.

At 310, clip 16 is coupled to housing 12. In one example, force is applied to clip body 200 to flex clip body 200 and increase the spacing between coupling members 202 such that protrusions 204 of coupling members 202 of clip 16 can each be positioned within an opposite cavity 122 of clip reception portion 120. Once so positioned, the flexing force is removed and clip 16 returns to its original shape. Additionally referring to FIG. 9, in one embodiment, each of protrusion 204 and cavity 122 have corresponding substantially X-shaped cross-sections to facilitate attachment of clip 16 to housing 12 and to generally prevent rotation of protrusions 204 relative to housing 12. In one embodiment, clip 16 is initially coupled to extend over the cover 22 of housing 12 as illustrated in FIGS. 1-6. However, in one example, clip 16 is configured to be flexed outwardly and removed from housing 12.

Once removed from housing, clip 16 can be flipped and repositioned to extend over base 20 rather than cover 22, flexed, and re-coupled to housing 12 in such a position, as will be apparent to those of skill in the art upon reading this application. Notably, the flexibility of clip 16 allows clip 16 to be flexed away from housing 12 while still coupled thereto, to more easily receive a garment or clothing item of the card bearer between clip 16 and housing 12. However, clip body 200 is biased toward housing 12 such that upon release of the force used to pull clip body 200 away from housing 12, clip 16 pushes back toward housing 12 to grasp or hold the garment between clip body 200 and housing 12. As such, stored-value card 10 is coupled to the card bearer via clip 16 allowing the card bearer to carry stored-value card 10 in a substantially hands-free manner.

At 304, the assembled stored-value card 10 is coupled with backer 250 (FIGS. 10 and 11) to form stored-value card assembly 252. In one example, stored-value card 10 is coupled to front surface 254 of backer 250 with adhesive or other selectively releasable material or device. Once stored-value card 10 is coupled to backer 250, account identifier 130 is viewable or otherwise accessible through window 258 of backer 250. Once assembled, stored-value card assembly 252 is ready for retail or other display for sale to potential consumers.

Figure 13:
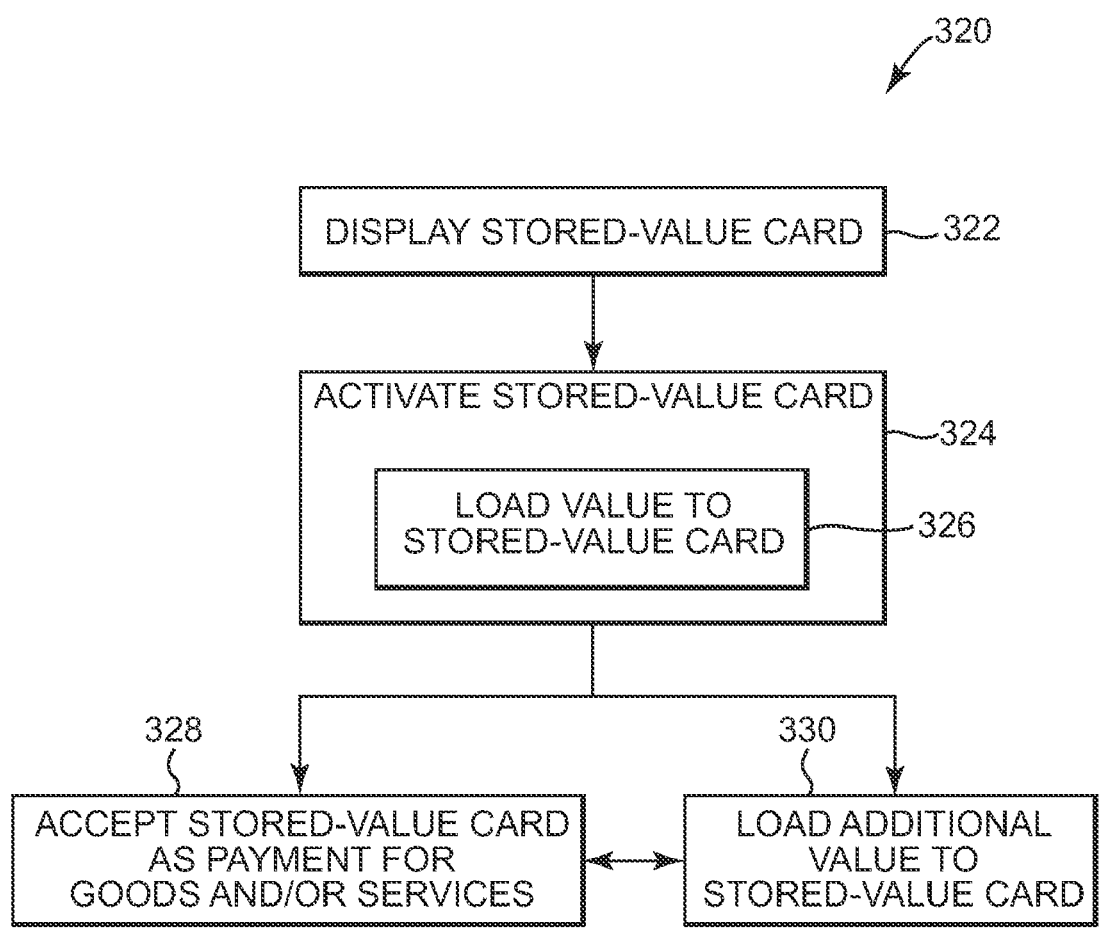
FIG. 13 is a flow chart illustrating a method of encouraging purchase and facilitating use of a stored-value card, according to one embodiment the present invention.

FIG. 13 is a flow chart illustrating one embodiment of a method 320 of encouraging purchase and facilitating use of stored-value card 10 by consumers. At 322, stored-value card 10 is placed within a display carton or other display and/or is hung from a rack, shelf, or other similar device to display stored-value card 10 for sale to potential consumers. In one example, stored-value card 10 is placed for retail sale when assembled to backer 250 as part of stored-value card assembly 252. In one embodiment, a depiction of stored-value card 10 is placed on a website for viewing and purchase by potential consumers.

At 324, a consumer who has decided to purchase stored-value card 10 presents the stored-value card 10 on backer 250 to a retail store employee, retail store kiosk, remote terminal, or other person or device to scan account identifier 130 to access a financial account or financial record linked to account identifier 130. In particular, account identifier 130 is scanned or otherwise accessed, for example, through window 258 of backer 250 to activate stored-value card 10. Upon accessing the financial account or financial record, then, at 326, value is added to the financial account or financial record. Thus, stored-value card 10 is activated and loaded. Once stored-value card 10 is activated and loaded, stored-value card 10 can be used by the consumer or any other bearer of stored-value card 10 to purchase goods and/or services at the retail store or other affiliated retail setting or website. In one embodiment, where stored-value card 10 is displayed on a website at 322, then, at 324, stored-value card 10 may be activated in any suitable method and may not require the physical scanning of account identifier 130 to be activated or to otherwise access the associated financial account or record such as at 326.

At 328, the retail store or other affiliated retail setting or website accepts stored-value card 10 as payment toward the purchase of goods and/or services made by the current bearer of stored-value card 10. In particular, the value currently loaded on stored-value card 10 (i.e. stored or recorded in the record or account linked to account identifier 130) is applied towards the purchase of goods and/or services. At 330, additional value is optionally loaded on stored-value card 10 at a point of sale terminal, kiosk, or other area of the retail store, web site, or related setting. Upon accepting stored-value card 10 as payment at 328, the retail store or related setting can subsequently perform either operation 328 or operation 330 as requested by a current bearer of stored-value card 10. Similarly, upon loading additional value on stored-value card 10 at 330, the retail store or related setting can subsequently perform either operation 330 again or operation 328. In one example, the ability to accept stored-value card 10 as payment for goods and/or services is limited by whether the financial account or financial record associated with stored-value card 10 has any value stored or recorded therein at the time of attempted redemption.

Figure 14:
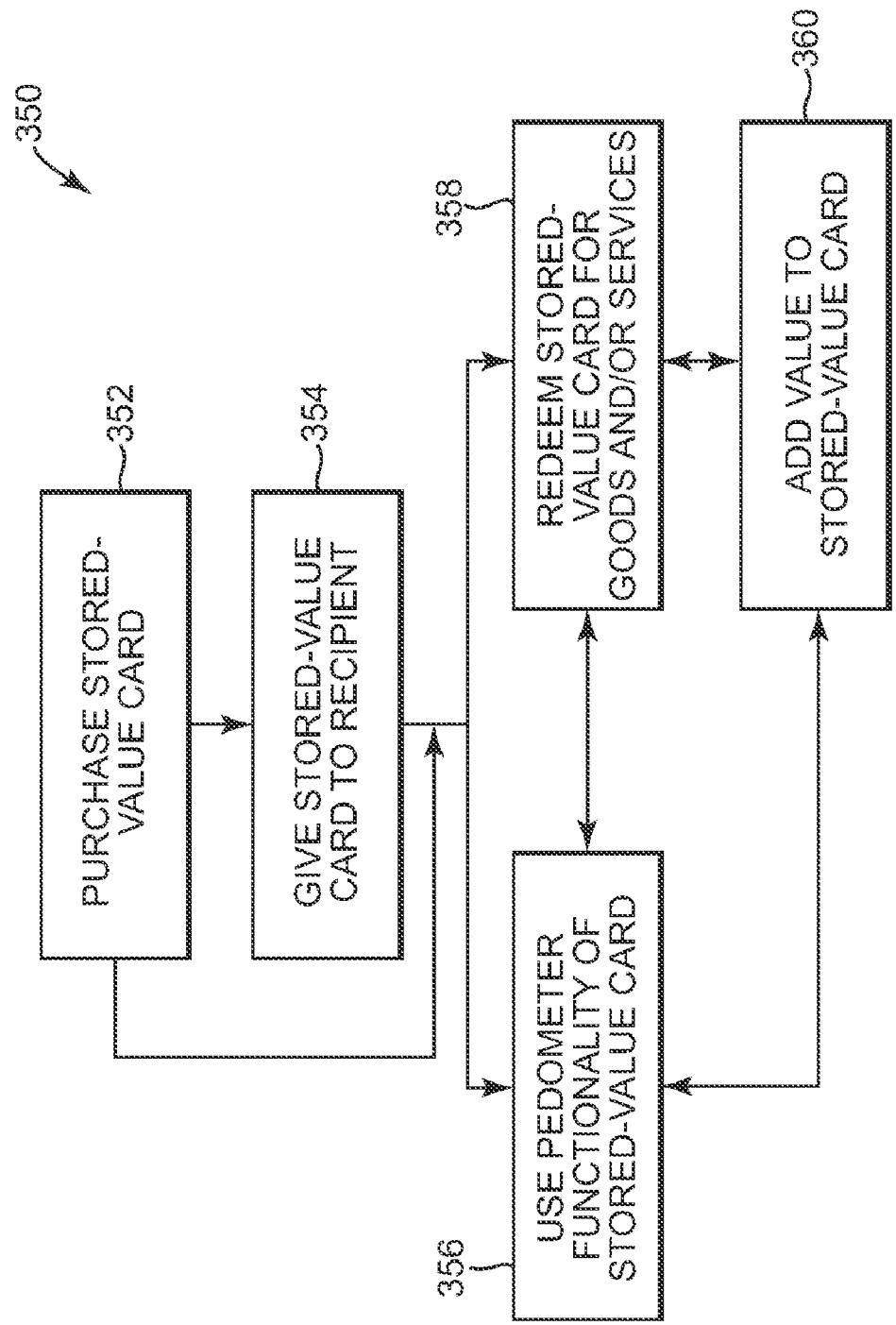
FIG. 14 is a flow chart illustrating a method of using a stored-value card, according to one embodiment of the present invention.

FIG. 14 is a flow chart illustrating one embodiment of a method 350 of using stored-value card 10 (FIGS. 1-6). At 352, a potential consumer of stored-value card 10, which is displayed in a retail store or viewed on a website, decides to and does purchase stored-value card 10 from the retail store or website. Stored-value card 10 can be displayed and purchased alone or as part of stored-value card assembly 252 (FIG. 10) along with backer 250. Upon purchasing a stored-value card 10, a retail store employee, a retail store kiosk, or other person or device scans account identifier 130 (FIG. 3) through window 258 of backer 250 or otherwise reads or accesses account identifier 130. Upon accessing account identifier 130, the financial account or record linked to account identifier 130 is accessed and activated to load value onto stored-value card 10. In one embodiment, such as where stored-value card 10 is purchased at 352 via a website, actual scanning of account identifier 130 may be eliminated.

At 354, the consumer optionally gives stored-value card 10 to a recipient, such as a graduate, relative, friend, expectant parents, one having a recent or impending birthday, a couple having a recent or impending anniversary, etc. In one embodiment, a plurality of stored-value cards 10 are purchased and given to party goers, such as at a birthday party, etc. as party favors or gifts. As an alternative, the consumer can keep stored-value card 10 for his or her own use thereby eliminating operation 354.

At 356, the consumer or recipient, whoever is in current ownership or otherwise is the current bearer of stored-value card 10, removes stored-value card 10 from backer 250 if stored-value card 10 is coupled with backer 250. The current bearer of stored-value card 10 can clip stored-value card 10 to their clothing and/or use stored-value card 10 as a pedometer. As such, the card bearer utilizes the dual functionality of stored-value card 10. In one embodiment, use of stored-value card 10 include card bearer interaction with buttons 110, and therefore switches 190, to alter the functionality, modes, to personalize the stride settings, to personalize the weight of the card bearer used to determine the number of calories burned, to set the clock, etc. of stored-value card 10, for example as described by instruction indicia 264 on backer 250 as illustrated in FIG. 11.

At 358, the current bearer of stored-value card 10 redeems stored-value card 10 for goods and/or services from the retail store or website. At 360, the current bearer of stored-value card 10 optionally adds value to stored-value card 10, and more particularly, to the financial account or financial record associated with stored-value card 10, at the retail store or over the Internet (i.e. via the website). Upon using the clip 16 and/or pedometer functionality of stored-value card 10 at 356, redeeming stored-value card 10 at 358, or adding value to stored-value card 10 at 360, the current bearer of stored-value card 10 subsequently can perform any of operations 356, 358, or 360 as desired. In one embodiment, the ability of the current bearer to repeat redeeming stored-value card 10 at 358 is limited by whether the financial account or financial record associated with stored-value card 10 has any remaining value stored or recorded therein at the time of attempted redemption.

Although described above as occurring at a single retail store or website, in one embodiment, purchasing stored-value card 10 at 352, redeeming stored-value card 10 at 358, and adding value to stored-value card 10 at 360, can each be performed at any one of a number of stores adapted to accept stored-value card 10 or over the Internet. In one example, a number of stores are each part of a chain or similarly branded stores. In one example, a number of stores include at least one website and/or at least one conventional brick and mortar store.

Stored-value cards come in many forms, according to embodiments of the invention. The gift card, like other stored-value cards, can be "re-charged" or "re-loaded" at the direction of the original consumer, the gift recipient, or third party. The term "loading on" or "loaded on" herein should be interpreted to include adding to the balance of a stared-value account or stored-value record associated with a stored-value card. The balance associated with the stored-value card declines as the card is used, encouraging repeat visits or other use. The card remains in the user's purse or wallet, serving as an advertisement or a reminder to revisit the associated merchant. Gift cards according to embodiments of the invention provide a number of advantages to both the consumer and the merchant. Other gift cards and stored-value cards according to embodiments of the invention include loyalty cards, calling cards, merchandise return cards, electronic gift certificates, employee cards, frequency cards, prepaid cards, and other types of cards associated with or representing purchasing power or monetary value, for example.

Although the invention has been described with respect to particular embodiments, such embodiments are for illustrative purposes only and should not be considered to limit the invention. Various alternatives and changes will be apparent to those of ordinary skill in the art. For example, adding value to stored-value card 10 optionally includes adding either a fixed amount or an amount that can be chosen by the customer or other user. Other modifications within the scope of the invention in its various embodiments will be apparent to those of ordinary skill.

What is claimed is:

1. A stored-value card comprising:
a housing including a machine readable bar code linked to a stored-value account or record such that the stored-value card can be used toward the purchase or use of at least one of goods and services;
a movement sensing mechanism substantially enclosed within the housing and configured to detect movement caused when a step is taken by a person carrying the stored-value card;
an electrical assembly substantially enclosed within the housing and in communication with the movement sensing mechanism, the electrical assembly being configured to identify movement detected by the movement sensing mechanism such that the movement sensing mechanism and the electrical assembly collectively function as a pedometer; and
a clip coupled with the housing and biased toward an outside surface defined by the housing, the clip configured to maintain a garment associated with the person, via interaction between the garment and each of the clip and the outside surface of the housing, to selectively hold the stored-value card to the person;
wherein the electrical assembly includes a display screen viewable through the outside surface of the housing, the outside surface is substantially planar, and the clip extends over the outside surface around at least three sides of the display screen.

2. The stored-value card of claim 1, wherein the display screen is configured to visually indicate content including one or more of a cumulative number of steps taken by the person, a cumulative distance walked by the person, and a cumulative number of calories burned by the person.

3. The stored-value card of claim 2, wherein the display screen is configured to visually indicate the cumulative number of steps taken by the person, the cumulative distance walked by the person, and the cumulative number of calories burned by the person, and wherein the stored-value card further comprises a button configured to interact with the electrical assembly to change the content shown on the display screen between the cumulative number of steps taken by the person, the cumulative distance walked by the person, and the cumulative number of calories burned by the person.

4. The stored-value card of claim 1, wherein the housing includes a base primary panel, a cover primary panel spaced from the base primary panel, and a side wall extending between the base primary panel and the cover primary panel about a perimeter of the stored-value card such that the movement sensing mechanism and the electrical assembly are stored between the base primary panel, the cover primary panel, and the side wall.

5. The stored-value card of claim 1, wherein the outside surface is a first outside surface, the housing defining a second outside surface, which is substantially planar and positioned opposite the first outside surface, and the machine readable bar code is included on the second outside surface.

6. The stored-value card of claim 1, wherein:
the outside surface of the housing is a cover surface of the housing,
the housing additionally defines:
a base surface opposite the cover surface,
a sidewall extending between the cover surface and the base surface, and
a coupling portion extending away from the sidewall in a direction substantially parallel to the cover surface,
the machine readable bar code is affixed to the base surface,
the clip includes:
a U-shaped clip body having two opposing ends, and
two coupling members, each of the two coupling members being attached to a different one of the two opposing ends of the U-shaped clip body,
the coupling portion of the housing defines two ends opposite one another,
each of the two coupling members of the clip is selectively coupled to a different one of the two ends of the coupling portion of the housing such that the U-shaped clip body extends directly over and is biased toward one of the cover surface and the base surface,
each of the two coupling members of the clip is configured to be readily uncoupled from the different one of the two ends of the coupling portion of the housing and readily coupled with opposite ones of the two ends of the coupling portion such that the U-shaped clip body extends directly over and is biased toward the other one of the cover surface and the base surface,
and when coupled, interaction between the two coupling members of the clip and the two ends of the coupling portion of the housing substantially prevents rotation of the two coupling members of the clip relative to the coupling portion of the housing.

7. A financial transaction card comprising:
an enclosure including an account identifier linked to a financial account or record such that the financial transaction card can be used toward the purchase or use of at least one of goods and services, the enclosure including:
a base panel,
a cover panel coupled to the base panel, and
a side wall extending between the base panel and the cover panel around a perimeter of the enclosure;
a step detector positioned within the enclosure and configured to perceive movement caused each time a card bearer carrying the financial transaction card takes a step;
a processing device positioned within the enclosure and in communication with the step detector, the processing device being configured to identify movement perceived by the step detector and to determine a cumulative number of steps taken by the card bearer while carrying the financial transaction card, wherein the step detector and the processing device are disposed between the base panel and the cover panel;
a clip reception portion extending from the side wall away from a remainder of the enclosure; and
a clip coupled to each of opposite ends of the clip reception portion and extending over and biased toward one of the base panel and the cover panel such that an item can be maintained between the clip and the one of the base panel and the cover panel.

8. The financial transaction card of claim 7, wherein the processing device includes a display screen visible through an aperture defined by the enclosure, the display screen configured to visibly indicate content including the cumulative number of steps.

9. The financial transaction card of claim 7, wherein the processing device includes an open circuit, and the step detector includes a conductive foot configured to selectively close the open circuit of the processing device when the card bearer takes a step.

10. The financial transaction card of claim 7, further comprising one or more buttons coupled with the enclosure and in communication with the processing device such that depression of the one or more buttons allows the card bearer carrying the financial transaction card to enter one or more of a stride length and a weight associated with the card bearer.

11. The financial transaction card of claim 7, wherein the side wall is a first side wall and the financial transaction card further comprises a second side wall, the first side wall extending from the cover panel to define a first edge opposite the cover panel, and the second side wall extending from the base panel to define a second edge opposite the base panel, wherein the first edge abuts the second edge when the enclosure is assembled.

12. The financial transaction card of claim 7, wherein the cover panel and the base panel are coupled together with one or more connection devices formed separately from the cover panel and the base panel.

13. A stored-value card comprising:
a housing including an account identifier linked to a stored-value account or record such that the stored-value card can be used toward the purchase or use of at least one of goods and services, the housing defining a front primary panel and a rear primary panel;
a clip externally coupled with the housing and biased toward one of the front primary panel and the rear primary panel, such that a garment can be secured between the clip and the one of the front primary panel and the rear primary panel;
wherein the clip includes coupling members and a U-shaped clip body having two ends, each coupling member is attached to a different one of the two ends of the U-shaped clip body, wherein each coupling member is separately coupled with the housing;
wherein the housing is substantially rectangular in shape other than a coupling portion extending outwardly from the otherwise substantially rectangular shape of the housing, and the coupling members are each configured to be received within an opposite end of the coupling portion of the housing.

14. The stored-value card of claim 13, wherein the U-shaped clip body includes a metal material, and the clip includes a polymeric member extending around a portion of the clip body opposite the coupling members.

15. The stored-value card of claim 13, wherein the clip is selectively couplable to the housing such that in a first coupled position the clip extends over and is biased toward the front primary panel and in a second coupled position the clip extends over and is biased toward the rear primary panel.

16. A stored-value card comprising:
a housing including an account identifier linked to a stored-value account or record such that the stored-value card can be used toward a purchase or use of at least one of goods and services, the housing defining a front primary panel and a rear primary panel;
a clip externally coupled with the housing and biased toward one of the front primary panel and the rear primary panel, such that a garment can be secured between the clip and the one of the front primary panel and the rear primary panel;
wherein the clip includes coupling members and a U-shaped clip body having two ends, each coupling member is attached to a different one of the two ends of the U-shaped clip body, each coupling member is separately coupled with the housing, the housing is substantially rectangular in shape other than a coupling portion extending outwardly from the otherwise substantially rectangular shape of the housing, the coupling members are each configure to be received within an opposite end of the coupling portion of the housing, each of the coupling members includes a coupling member protrusion with a substantially X-shaped cross-section extending toward one another, and the coupling portion defines a cavity with a corresponding substantially X-shaped cross-section for receiving each coupling member protrusion.

17. The stored-value card of claim 16, wherein the U-shaped clip body includes a metal material, and the clip includes a polymeric member extending around a portion of the clip body opposite the coupling members.

18. The stored-value card of claim 16, wherein the clip is selectively couplable to the housing such that in a first coupled position the clip extends over and is biased toward the front primary panel and in a second coupled position the clip extends over and is biased toward the rear primary panel.

19. The stored-value card of claim 16, wherein the clip extends directly over and is biased toward the front primary panel, and the stored-value card further includes a display screen viewable through the front primary panel.

20. The stored-value card of claim 19, wherein the clip extends around at least three sides of the display screen.

21. The store-value card of claim 16, wherein the clip extends directly over and is biases toward the front primary panel, and the stored-value card further includes a pedometer housed substantially within the housing and having buttons controlling at least a portion of the pedometer accessible through the front primary panel of the housing.

22. A method of promoting sales of and selling a stored-value card, the method comprising:
displaying a stored-value card including a housing linked to a stored-value account or record such that the stored-value card can be used toward a purchase or use of at least one of goods and services, a step detector maintained within the housing and configured to perceive movement caused when a step is taken by a person carrying the stored-value card, and an electrical assembly maintained within the housing and in communication with the step detector, the electrical assembly being configured to identify movement perceived by the step detector;
providing one or more buttons on the stored-value card for interacting with the electrical assembly to alter content displayed by a display screen of the electrical assembly and to enter additional information to the electrical assembly;
activating the stored-value card to permit deductions from the stored-value account or record; and receiving the stored-value card as payment for one or more of good and services, the value of the one or more of goods and services being deducted from the stored-value account or record;

wherein each of the one or more buttons extends out of a substantially planar cover panel of the housing, and displaying the stored-value card includes displaying a clip that is selectively couplable to the housing via a clip reception portion such that in a first coupled position, the clip is biased toward the substantially planar cover panel such that the stored-value card is configured to maintain a garment associated with a user via interaction between the garment and each of the clip and the substantially planar cover panel of the housing, and in a second coupled position, the clip is biased toward a base panel of the housing.

23. A financial transaction card comprising:

an enclosure including an account identifier linked to a financial account or record such that the financial transaction card can be used toward a purchase or use of at least one of goods and services, the enclosure including:
- a base panel,
- a cover panel coupled to the base panel, and
- a side wall extending between the base panel and cover panel around a perimeter of the enclosure;

a step detector positioned within the enclosure and configured to perceive movement caused each time a card bearer carrying the financial transaction card takes a step;

a processing device positioned within the enclosure and in communication with the step detector, the processing device being configured to identify movement perceived by the step detector and to determine a cumulative number of steps taken by the card bearer while carrying the financial transaction card, wherein the step detector and the processing device are disposed between the base panel and the cover panel;

a clip reception portion extending from the side wall away from a remainder of the enclosure; and a clip coupled to the clip reception portion and extending over and biased toward one of the base panel and the cover panel such that an item can be maintained between the clip and the one of the base panel and the cover panel, wherein the clip is selectively couplable with the clip reception portion such that in a first coupled position the clip extends over and is biased toward the cover panel and in a second coupled position the clip extends over and is biased toward the base panel.

24. The financial transaction card of claim 23, wherein the clip is configured such that the clip is uncoupled from the housing to transition the clip between the first coupled position and the second coupled position.

25. The financial transaction card of claim 23, further comprising a display screen electrically coupled with the processing device and viewable through the cover panel, wherein the account identifier is positioned on an outside surface of the base panel.

* * * * *